UNITED STATES PATENT OFFICE.

JOHN WATSON BURTON, OF LEEDS, ENGLAND.

IMPROVEMENT IN TREATING AND REFINING OILS AND FATS.

Specification forming part of Letters Patent No. 130,277, dated August 6, 1872.

*To all to whom it may concern:*

Be it known that I, JOHN WATSON BURTON, of Leeds, in the county of York, England, have invented or discovered certain new and useful "Improvements in Treating and Refining Oils and Fats for Lubricating and Other Purposes;" and I do hereby declare that the following is a full and exact description thereof.

This invention has for its object the manufacture of a new material which I call "almond-oil," and also an improved method of treating or refining oils and fats so as to effect improvements in such oils and fats, and to better adapt them for lubricating and commercial purposes, by the use of the said almond-oil; and the invention consists in treating petroleum or mineral oil by subjecting it to the action of the oil of mirbane, known commercially as artificial or factitious oil of almonds, in order to produce the above-mentioned almond-oil. The invention also consists in mixing my almond-oil with oils and fats so as either to refine such oils and fats or by such mixture of my said almond-oil with them to render such last-mentioned oils and fats cheaper and more usefully applicable for a variety of purposes.

The oil of mirbane is intimately mixed with petroleum or mineral oil by stirring them together in a suitable vessel, or by distillation, or by the introduction of the vapor of the oil of mirbane; in either case sufficient of the latter-named oil is to be introduced to remove from the petroleum the blue shade thereof, and the proportion will vary according to the quality of the petroleum. It will be discovered that the two oils have combined and made a new substance; the smell of the petroleum is removed; earthy and watery portions of the petroleum are deposited; the oil is much more dense than either the petroleum or the oil of mirbane separately; the oil is capable of saponification, which is not the case with petroleum; hence it is very valuable in the preparation of wool, because it is very penetrating, but can be removed in the washing; and the oil is much safer for general purposes than coal-oil, because it is not so inflammable. To the oil produced by combining said mirbane and coal-oil I give the name of "almond-oil," as a matter of convenience. By the treatment of mineral oil by the oil of mirbane the product is of a different gravity from either oil separately, and the gravity will vary according to the relative properties of the two oils, and for lubricating purposes this "almond-oil" is superior to lubricants now in use, because it flows freely, but is not thin and of a watery consistence, like coal-oil.

I have thus described my process as applied to petroleum or mineral oil after distillation, but my said process may also be applied in like manner to the crude petroleum or mineral oil before distillation; but I prefer to treat the petroleum or mineral oil, after distillation, in the manner and for the purposes hereinbefore described.

I treat or refine vegetable, animal, fish, and mineral oils by simply mixing them with my almond-oil; or I use for this purpose a mixture of my almond-oil with some other oil, using such mixture as refining-oil, which I mix with the oils and fats intended to be refined in suitable proportions, either allowing sufficient time for their perfect combination, or, after mixing such refining-oil with the oils or fats to be refined, I subject the last-mentioned mixture to agitation, continuing the agitation until the desired paleness or purity is acquired; and by this means brown or raw oils I convert into pale or refined oils. I use for this purpose from one per cent. and upward of my almond-oil, according to the extent of color or impurity contained in the raw oil and the paleness or purity desired; and in the like manner I treat or refine fats, bringing them into contact with refining oil or oils when they are in a molten or fluid state.

The almond-oil, when made as aforesaid and mixed with cod or fish oil, converts all the "foots" of such fish-oil into a fine, clear oil, without residuum or waste, and the oil is especially adapted to use in dressing leather, as it imparts a softer and better finish than that of the ordinary oils.

I claim as my invention—

1. The improved oil made by combining oil of mirbane with coal-oil, substantially as set forth.

2. The aforesaid coal-oil and oil of mirbane, in combination with whale-oil, tallow, or similar material, substantially as set forth.

JOHN WATSON BURTON.

Witnesses:
 J. W. HARDING,
 GEO. DIBLE.